(12) United States Patent
Rayala (10) Patent No.: US 7,386,120 B2
(45) Date of Patent: Jun. 10, 2008

(54) ECHO CANCELLER HAVING A FREQUENCY DOMAIN ACTIVE REGION LOCATION ESTIMATOR

(75) Inventor: Jitendra Rayala, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 791 days.

(21) Appl. No.: 10/837,454

(22) Filed: Apr. 30, 2004

(65) Prior Publication Data

US 2005/0243994 A1 Nov. 3, 2005

(51) Int. Cl.
*H04M 9/08* (2006.01)
(52) U.S. Cl. .................................. 379/406.01
(58) Field of Classification Search ............ 379/406.01
See application file for complete search history.

(56) References Cited

U.S. PATENT DOCUMENTS 5,587,998 A * 12/1996 Velardo et al. ............ 370/289
6,842,516 B1 * 1/2005 Armbruster ............ 379/390.02
6,928,160 B2 * 8/2005 Ebenezer et al. ...... 379/406.06
6,968,064 B1 * 11/2005 Ning ............................ 381/66

\* cited by examiner

*Primary Examiner*—Curtis Kuntz
*Assistant Examiner*—Alexander Jamal
(74) *Attorney, Agent, or Firm*—Mike Bush PLLC (57) ABSTRACT

Method and apparatus for canceling an echo path by locating an active region thereof for subsequent application of a filter thereto. A plurality of far-end signals $R_{IN}(n)$ and a corresponding plurality of near-end signals $S_{IN}(n)$ are acquired. Correlation within the far-end and near-end signals $R_{IN}(n)$ and $S_{IN}(n)$ is removed and gain control applied to bring the corresponding ones of the far-end and near-end signals $R_{IN}(n)$ and $S_{IN}(n)$ to a uniform level. The plurality of far-end and near-end signals $R_{IN}(n)$ and $S_{IN}(n)$ are then stored in respective data blocks. The stored data blocks are subsequently processed together to determine a set of coefficients for a bank of adaptive filters. An energy estimate is computed for each one of the bank of adaptive filters and the location of the active region of the echo determined from the energy estimates.

14 Claims, 4 Drawing Sheets

ECHO CANCELLER HAVING A FREQUENCY DOMAIN ACTIVE REGION LOCATION ESTIMATOR

FIELD OF THE INVENTION

The present invention relates generally to telecommunication systems and, more particularly, to a method and apparatus for echo cancellation in either a regular telephone network or a voice-over-packet network.

DESCRIPTION OF RELATED ART

The public switched telephone network (PSTN) employs both two-wire and four-wire segments. For example, subscriber lines are normally two-wire segments while interexchange lines are normally four-wire segments. The PSTN further employs two-wire to four-wire transformers, commonly known as hybrid circuits, to interconnect two-wire and four-wire segments together. Unfortunately, impedance mismatches within a hybrid circuit tends to produce an electrical echo having the potential of degrading the quality of communications over the telephone network.

To avoid such degradations, a common practice has been to further employ echo cancellers within the PSTN. An echo canceller is a signal processing device, e.g. a device for processing speech signals, employed for reducing echo by subtracting an estimate of an echo path from the echo path present in an established voice connection. To perform cancellation of an echo path, an echo canceller will typically include an adaptive filter (AF) which estimates a replica of the echo path from the signal generated by the calling party and a logical summer which cancels the echo path by subtracting the replica of the echo path from the signal generated by the called party. To estimate the replica of the echo path from the signal generated by the calling party, the adaptive filter must employ an adaptive algorithm. Because it has the least processing and memory requirements, the most popular of the known adaptive algorithms suitable for used in adaptive filters is the normalized least mean square (NLMS) algorithm.

The deployment and performance requirements of echo cancellers are governed by various standards developed by the International Telecommunication Union (ITU) such as the G.168 Standard, which is set out in *ITU-T Recommendation G.168: Echo Cancellers*, 2002. The G.168 Standard specifies various operating conditions under which echo cancellers must perform. In order to be G.168 compliant, an echo canceller must be able to perform under the following operating conditions:

(1) a minimum echo return loss (ERL) of 6 dB;

(2) a signal-to-noise ratio (SNR) of 15 dB at near-end; and (3) a far-end signal $R_{IN}$ having a level $L_{RIN}$ in the range of 0 to −30 dBm.

Currently echo cancellers are designed and implemented on programmable digital signal processors (DSPs). The reprogrammability feature of DSPs both enables complex algorithms to be implemented with greater ease and allows changing application requirements to be readily addressed. In a paper titled *Algorithmic and Implementation Aspects of Echo Cancellation in Packet Voice Networks,* offered at the 36th Conference on Signals, Systems and Computers, November 2002 by Krisha et al., various aspects of designing echo cancellers for use in voice gateways to packet networks is discussed. With the advent and proliferation of voice-over-packet networks, the echo cancellation requirements have changed significantly. These requirements include the following:

(1) Echo cancellers are expected to cancel echoes with long echo paths, typically, echoes having an echo path T between about 64 msec and about 128 msec. If the sampling rate $F_s$ at which the signals are sampled is 8 kHz, then the length of the adaptive filter needed to cancel echoes with long echo paths would be between N=512 and N=1024 taps. It is contemplated that a large increase in the processing complexity imposed on the DSPs would result from the use of adaptive filters of such lengths, even when the NLMS algorithm is employed.

(2) Echo cancellers are now expected to work with a wide range of signal levels conforming to the G.168 Standard. As a result, an adaptive filter should provide suitable echo cancellation for signals within a range of levels, typically, 0 to −30 dBm, when the number of filter coefficients are large. When the number of filter coefficients increase, however, convergence of the adaptive filter tends to deteriorate.

(3) The G.168 Standard requires that an adaptive filter provide sufficient cancellation within one second from the beginning of the call. Adaptive filters using the NLMS algorithm tend to converge slowly, however, when the number for filter coefficients are large. As a result, such adaptive filters may not meet this particular requirement of the G.168 Standard. Convergence of such adaptive filters such can, however, be improved by employing fast algorithms like the recursive least squares (RLS) algorithm. However, such algorithms are very expensive computationally and are often too unstable for real-time implementation.

Although large adaptive filters may be used for the cancellation of echoes having very long echo paths such as those contemplated by the G.168 Standard, such an approach is often unsuitable because of various complexities that result from the size of the adaptive filter. For example, large adaptive filters tend to consume greater amounts of resources such as memory storage and processor cycles. Such levels of resource consumption can easily become a bottleneck if a voice gateway utilizing the large adaptive filter for each echo path cancellation is expected to handle large numbers of channels. Another concern relates to the convergence of the large adaptive filter. Typically, the convergence of a large adaptive filter will be very slow because of the large number of filter coefficients associated therewith. As a result, an echo canceller incorporating a large adaptive filter may not satisfy the stringent convergence requirements of the G.168 Standard.

It has been noted that, for a typical network, the filter coefficients for an impulse response characteristic of an echo path are zero for much of the echo path and become non-zero for only a small region, commonly known as the active region, of the echo path. Thus, if a large filter is used to cancel an echo path which is non-zero only in a relatively small active region thereof, a loss in performance due to overmodeling will result. Various echo cancellers which have sought to cancel only a certain region of the echo path have been disclosed in the art. For example, U.S. Pat. No. 4,562,312 to Duttweiler discloses an echo canceller which utilizes a delay estimation algorithm. In Duttweiler, the pure delay in the echo path response is identified by subsampling the near-end and far-end signals. A cross correlation of the subsampled signal is then computed using an adaptive filter. In U.S. Pat. No. 5,737,410 to Vähätalo et al., an echo canceller which estimates the delay using a direct cross correlation of the near-end and far-end signals is disclosed.

As noted above, current methods and systems used in PSTNs must comply with the performance levels specified by the G.168 Standard. Due to the length of the echo path and/or delays associated therewith, achieving these performance levels is especially difficult when using a large adaptive filter. Accordingly, what is needed are systems and methods for: (1) identifying the location of the active region within an impulse response characteristic of an echo path; and (2) designing echo cancellers which meet or exceed the performance levels of the G.168 Standard. By doing so, an echo canceller characterized by both reduced complexity and reduced consumption of resources would be produced.

SUMMARY OF THE INVENTION

In one embodiment, the present invention is directed to a method for identifying an active region of an echo path by generating a set of coefficients, each of which describes a filter which covers a portion of the echo path and estimating, from the generated set of coefficients, the location of the active region of the echo path. In one aspect, the location of the active region of the echo path is estimated by determining at least one energy estimate from the generated set of coefficients and selecting, from the determined energy estimates, a first one of the energy estimates as the location of the active region of the echo path. Preferably the selected energy estimate is identified after comparing the level of each energy estimate to a pre-selected threshold value and selecting one of the energy estimates which exceeds the pre-selected threshold value. In another aspect thereof, the set of coefficients are in the frequency domain and the energy estimates are determined from this set of coefficients.

In further aspects of this embodiment of the invention, the set of coefficients are generated by processing together a first plurality of far-end signals $R_{IN}(n)$ and a second, corresponding, plurality of near-end signals $S_{IN}(n)$. A column vector of the far-end signals is constructed from the first plurality of far-end signals $R_{IN}(n)$ and a column vector of the near-end signals is constructed from the second plurality of near-end signals $S_{IN}(n)$. The far-end and near-end signal vectors are transformed into the frequency domain by application of the Discrete Fourier Transform (DFT) and the set of coefficients identified from the transformed far-end and near-end signal vectors.

In still further aspects of this embodiment of the invention, to process the first plurality of far-end signals $R_{IN}(n)$ and the second, corresponding, plurality of near-end signals $S_{IN}(n)$ together, a first plurality of far-end signals $R_{IN}(n)$ and a second, corresponding, plurality of near-end signals $S_{IN}(n)$ are acquired. The range of input levels of the acquired signals are then modified by bringing each one of the first plurality of far-end signal $R_{IN}(n)$ and the corresponding one of the second plurality of near-end signals $S_{IN}(n)$ to a uniform level.

In another embodiment, the present invention is directed to a method for canceling an echo generated by a hybrid circuit of a telecommunications network. In accordance with the method, a first plurality of far-end signals $R_{IN}(n)$ and a corresponding plurality of near-end signals $S_{IN}(n)$ are acquired. A column vector of the far-end signals is constructed from the first plurality of far-end signals $R_{IN}(n)$ and a column vector of the near-end signals is constructed from the second plurality of near-end signals $S_{IN}(n)$. DFTs of the column vectors of the far-end signals and near-end signals $R_{IN}(n)$ and $S_{IN}(n)$ are determined and, from the DFTs, a bank of adaptive filters are identified. An energy estimate is computed from each one of the bank of adaptive filters and a location of an active region of the echo path is identified from the energy estimates. The echo path may then be canceled by applying an adaptive filter to the determined location of the active region.

In one aspect of this embodiment of the invention, each one of the bank of adaptive filters is defined by a set of coefficients. In this aspect, the energy estimates for the bank of adaptive filters are determined from the set of coefficients. In another aspect, the location of the active region is determined by comparing the energy estimates to a pre-selected threshold value. In this aspect, an energy estimate having a value which exceeds the pre-selected threshold value corresponds to the location of the active region within the echo path.

In further aspects of this embodiment of the invention, correlation within the far-end signals $R_{IN}(n)$ and the near-end signals $S_{IN}(n)$ is removed. Gain control may then be applied to bring each one of the far-end signals $R_{IN}(n)$ and the corresponding one of the near-end signals $S_{IN}(n)$ to a uniform level. The far-end signals $R_{IN}(n)$ may then be stored in a first data block while the corresponding near-end signals $S_{IN}(n)$ are stored in a second data block. The first block of far-end signals $R_{IN}(n)$ and the second block of near-end signals $S_{IN}(n)$ may then be processed together to determine the DFTs of the column vectors of the far-end signals and near-end signals $R_{IN}(n)$ and $S_{IN}(n)$.

In still another embodiment, the present invention is directed to an echo canceller comprised of an active region locator circuit and an adaptive filter coupled to the active region locator circuit. The active region locator circuit is configured to adaptively locate an active region of an echo path. Upon locating the active region, the active region locator circuit provides the location to the adaptive filter. In turn, the adaptive filter applies a filter to the location, indicated by the active region locator circuit, as the location of the active region of the echo path.

DETAILED DESCRIPTION

Figure 1:
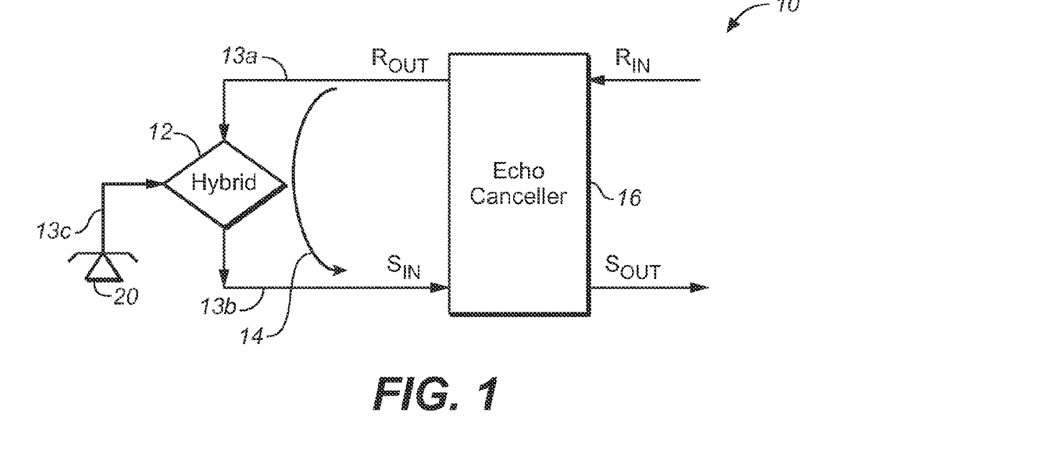
FIG. 1 is a block diagram of a telecommunications network incorporating an echo canceller constructed in accordance with the teachings of the present invention.

Referring first to FIG. 1, a portion of a telecommunications network 10, for example, the PSTN, is shown. As is well known in the art, the PSTN 10 employs any number of hybrids to connect two-wire and four-wire segments together and any number of echo cancellers to remove echo resulting from impedance mismatches within the hybrids. For example, in FIG. 1, the PSTN 10 includes a hybrid 12 and an echo canceller 16. The hybrid 12 couples 4-wire segment 13*a-b*, typically, a portion of the interexchange lines for the PSTN 10, to two-wire segment 13c, typically, a subscriber line for the PSTN 10 to which a first voice terminal 20, typically, a telephone, is coupled. The echo canceller 16, on the other hand, cancels the echo produced by the hybrid 12.

A voice signal $R_{IN}$ (periodically referenced herein as the "far-end signal $R_{IN}$") is originated by a calling party (periodically referenced herein as the "far-end speaker") using a second voice terminal not shown in FIG. 1. The $R_{IN}$ signal from the calling party is input the echo canceller 16. As will be more fully described below, the $R_{IN}$ signal is utilized, by the echo canceller 16, to cancel echo produced by the hybrid 12. The $R_{IN}$ signal also passes through the echo canceller 16 unchanged for transmission, to both the hybrid 12 and the first voice terminal 20, as the signal $R_{OUT}$. A voice signal $S_{IN}$ (periodically referenced herein as the "near-end signal $S_{IN}$"), typically spoken by the called party (periodically referenced herein as the "near-end speaker") in response to hearing the voice signal $R_{OUT}$, is originated by the called party using the first voice terminal 20.

Because of the aforementioned shortcomings of the hybrid 12, the voice signal $S_{IN}$ may contain both a speech component from the first voice terminal 20 and an echo component of the voice signal $R_{IN}$ from the hybrid 12. Of course, if the near-end speaker is silent, then the voice signal $S_{IN}$ will contain only the echo component of the voice signal $R_{IN}$ produced by the hybrid 12. As will be more fully described below, the echo canceller 16 cancels the echo of the voice signal $R_{IN}$ signal from the voice signal $S_{IN}$ and outputs a voice signal $S_{OUT}$ which contains only the speech component from the first voice terminal 20 for transmission to the calling party at the second voice terminal. Of course, absent cancellation, by the echo canceller 16, of the echo component of the voice signal $R_{IN}$ generated by the hybrid 12, the voice signal $S_{OUT}$ would be identical to the voice signal $S_{IN}$.

As may be further seen in FIG. 1, echo path 14 extends from the echo canceller 16, along the pair of input lines 13a of the 4-wire segment 13a-b, through the hybrid 12, along the pair of output lines 13b of the 4-wire segment 13a-b and back to the echo canceller 16. For the segment of the echo path 14 extending along the input lines 13a, the voice signal along the echo path 14 is comprised of the voice signal $R_{OUT}$ (which, as previously set forth is the same as $R_{IN}$). Under ideal conditions, the hybrid 12 would provide infinite attenuation and there would not be any leakage from the hybrid 12 into the return path and the return signal received by the echo canceller 16 would be comprised only of voice signal $S_{IN}$. However, practical hybrids provide only finite attenuation. Thus, a portion of the $R_{OUT}$ signal will appear in the return direction and the level of this signal will be less than the original level of $R_{OUT}$.

Figure 2:
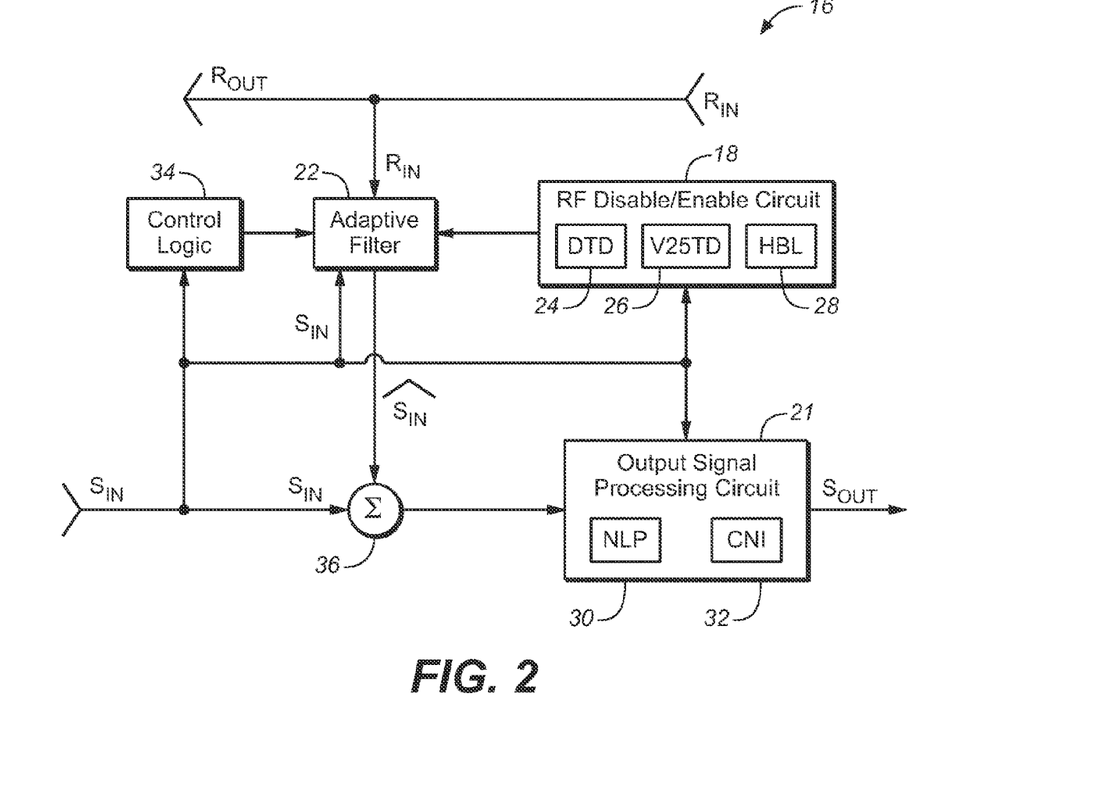
FIG. 2 is an expanded block diagram of the echo canceller illustrated in FIG. 1.

Referring next to FIG. 2, the echo canceller 16 will now be described in greater detail. As may now be seen, the echo canceller 16 includes an adaptive filter (AF) 22, an AF disable/enable circuit 18, an output signal processing circuit 21, control logic 34 and a logical summer 36. In turn, the AF disable/enable circuit 18 includes plural sub-circuits, including a double talk detection (DTD) sub-circuit 24, a V25 tone detection (V25TD) sub-circuit 26 and holding band logic (HBL) 28. Similarly, the output signal processing circuit 21 includes plural sub-circuits, including a non-linear processing (NLP) sub-circuit 30 and a comfort noise injection (CNI) sub-circuit 32. As will be more fully described below, to perform echo cancellation, the adaptive filter 22 estimates a replica signal $\hat{S}_{IN}$ of the echo using the voice signal $R_{IN}$ signal and the voice signal $S_{IN}$. A logical summer 36 then cancels the echo component of the $S_{IN}$ signal by subtracting the replica signal $\hat{S}_{IN}$ of the echo from the voice signal $S_{IN}$. It should be noted that, prior to usage in echo cancellation, it is necessary to train the adaptive filter 22 using a training process that assumes that the near-end voice signal $S_{IN}$ contains only the echo from the hybrid 12 and that the near-end speaker using the first voice terminal 20 is silent.

It should be further noted that the PSTN 10 will allow both the far-end speaker using the second voice terminal and the near-end speaker using the first voice terminal 20 to speak simultaneously. As a result, in normal usage, the return signal $S_{IN}$ will often contain both speech from the near-end speaker using the first voice terminal 20 as well as the echo signal produced by the hybrid 12. Because of this, the adaptive filter 22 will try to adapt to both the echo signal produced by the hybrid 12 as well as the voice signal originating at the first voice terminal 20. Under such conditions, the adaptive filter 22 will tend to diverge, thereby resulting in poor cancellation of the echo path. To avoid such a result, the DTD sub-circuit 24 of the AF disable/enable circuit 18 identifies the condition and acts to stop the adaptive filter 22 from diverging.

When telephone networks, such as the PSTN 10, are used for data/fax transmissions, the V25TD sub-circuit 26 disables the echo canceller 16 to preserve the integrity of the data being transmitted. For example, if, as part of a data/fax transmission, the first voice terminal 20 transmits a 2100 Hz tone with phase reversals, the V25TD sub-circuit 26 will detect this tone and disable the echo canceller 16. Once the data/fax transmission is complete, however, the echo canceller 16 must be re-enabled. Accordingly, the HBL 28 is configured to detect the completion of the data/fax transmission and, upon doing so, shall re-enable the echo canceller 16.

Residual echo may still be present in the return signal even after cancellation of the echo path by the adaptive filter 22. The NLP sub-circuit 30 is a simple device used to reduce the residual echo to any necessary returned echo level. For example, it is contemplated that a center clipper is suitable for use as the NLP sub-circuit 30. However, in some situations, it has been noted that when the return signal is suppressed completely, the line will appear to be dead to the far-end speaker operating the second voice terminal. In order to prevent this from happening, a noise signal commonly referred to as "comfort noise" is injected into the return path. Comfort noise, typically, noise spectrally matched to the background noise, is injected into the return path by the CNI sub-circuit 32.

Figure 3:
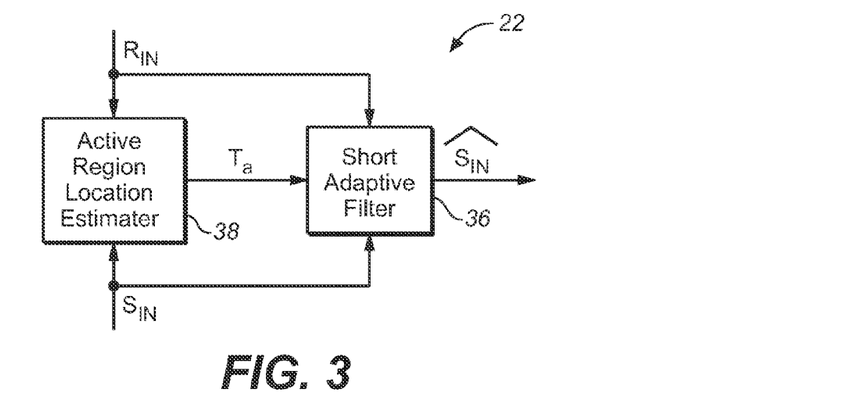
FIG. 3 is an expanded block diagram of an adaptive filter portion of the echo canceller of FIG. 2.

Referring next to FIG. 3, the adaptive filter 22 will now be described in greater detail. As may now be seen, the adaptive filter 22 is comprised of an active region location estimator 38 coupled to receive the far-end and near end-signals $R_{IN}$ and $S_{IN}$ and a short adaptive filter 36 coupled to receive the far-end and near end-signals $R_{IN}$ and $S_{IN}$ and further coupled to receive, from the active region location estimator 38, an estimate of the location of the active region of an echo path active region location estimator 38. As will be more fully described below, the active region location estimator 38 determines the location of the active region of an echo path. The determined location is subsequently provided to the short adaptive filter 36. In turn, the short adaptive filter 36 cancels the echo path by placing a filter around the active region thereof. As used herein, the term "short" generally refers to an adaptive filter sufficiently sized to cancel the active region of an echo path but substantially smaller than an adaptive filter sized to cancel the echo path in its entirety. While it is fully contemplated that the duration of both an echo path and an active region thereof may vary without departing from the scope of the present invention, in one example, an echo path having a duration of about 64 msec would include an active region having a duration of about 16-24 msec. In this example, a short adaptive filter would be capable of canceling the 16 msec active region of the echo path but would only be about ¼ the size of an adaptive filter capable of canceling the 64 msec echo path in its entirety.

Figure 4:
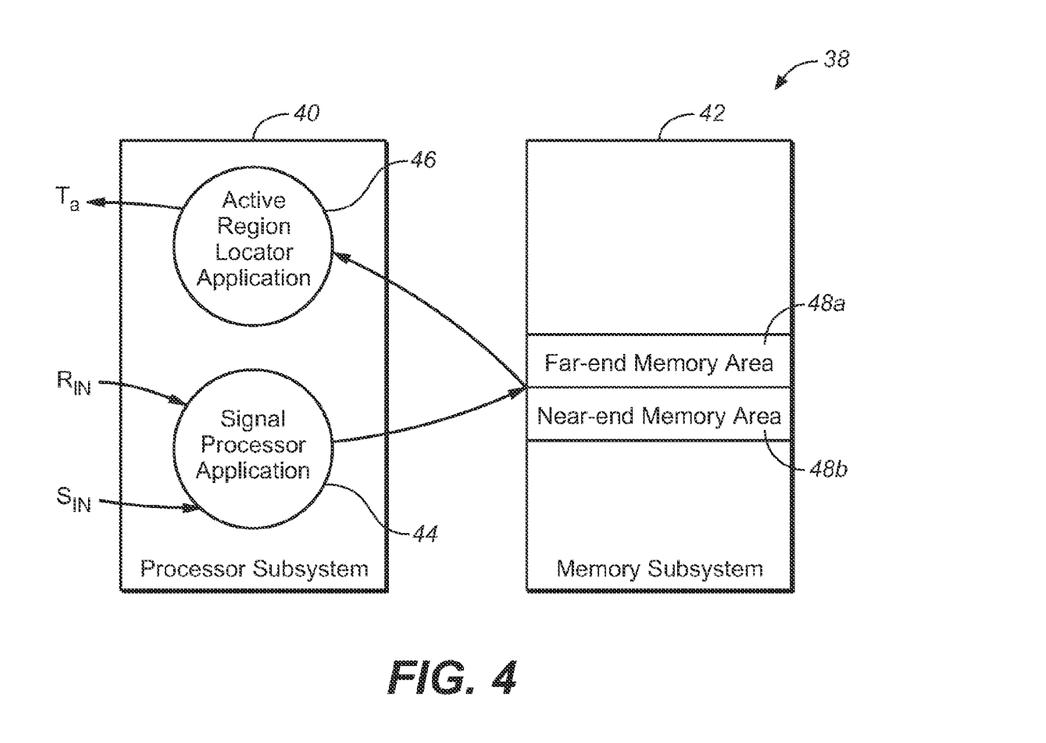
FIG. 4 is an expanded block diagram of an active region location estimator of the adaptive filter portion of FIG. 3.

Referring next to FIG. 4, the active region location estimator 38 will now be described in greater detail. As may now be seen, the active region location estimator 38 is comprised of a processor subsystem 40 coupled to a memory subsystem 42 by a bus subsystem (not shown) for bi-directional exchanges of address, data and control signals. In its broadest sense, the processor subsystem 40 represents the total processing capacity for the active region location estimator 38 and may be comprised of a discrete processing device or distributed amongst plural processing devices. Furthermore, it is contemplated that the one or more processing devices forming the processor subsystem 40 may be exclusively dedicated to the implementation of the active region location estimator 38 or may instead represent merely a portion of the functionality of a programmable DSP implementing the echo canceller 16 or a selected component thereof, for example, the adaptive filter 22. Similarly, in its broadest sense, the memory subsystem 42 represents the total memory capacity for the active region location estimator 38. Here, it is contemplated that the memory subsystem 42 may either be a discrete memory device or distributed amongst plural memory devices. Furthermore, it is contemplated that the one or more memory devices forming the memory subsystem 42 may be exclusively dedicated to the active region location estimator 38 or may instead represent merely a selected portion of a larger memory system dedicated to the echo canceller 16 itself or a selected component thereof, for example, the adaptive filter 22.

Residing on the processor subsystem 40 are a first (or "signal processing") application 44 and a second (or "active region locator") application 46. Each of the first and second applications 44 and 46 are a set of encoded instructions residing in the memory subsystem 42 and executable by the processor subsystem 40. Of course, rather than the plural applications and distribution of functionality amongst the plural applications illustrated in FIG. 4, it is fully contemplated that the active region location estimator 38 may instead be configured such that a single application performs all of the functions attributed herein to a selected one of either the first application 44 or the second application 46. It is further contemplated that the functionality attributed to one or more applications a single or plural applications residing within the memory subsystem 42 may instead reside within the memory subsystem of the echo canceller 16 or a selected component thereof, for example, the adaptive filter 22.

The memory subsystem 42 is comprised of one or more contiguous or non-contiguous memory areas. In FIG. 4, plural memory areas, more specifically, a first memory area 48a and a second memory area 48b, are shown. As will be more fully described below, the first and second memory areas 48a and 48b are used to hold the far-end and near-end signals $R_{IN}$ and $S_{IN}$, respectively, input the active region location estimator 38 after processing of those signals by the first application 44. The processed signals are subsequently used by the second application 46 to determine a location for the active region of the echo path for subsequent output to the short adaptive filter 36. Of course, rather than holding the far-end and near-end signals $R_{IN}$ and $S_{IN}$ in the first and second memory areas 48a and 48b of the memory subsystem 42, it is fully contemplated that dedicated memory devices, for example, far-end and near-end buffer memories, may be used to hold the far-end and near-end signals $R_{IN}$ and $S_{IN}$, respectively.

Figure 5:
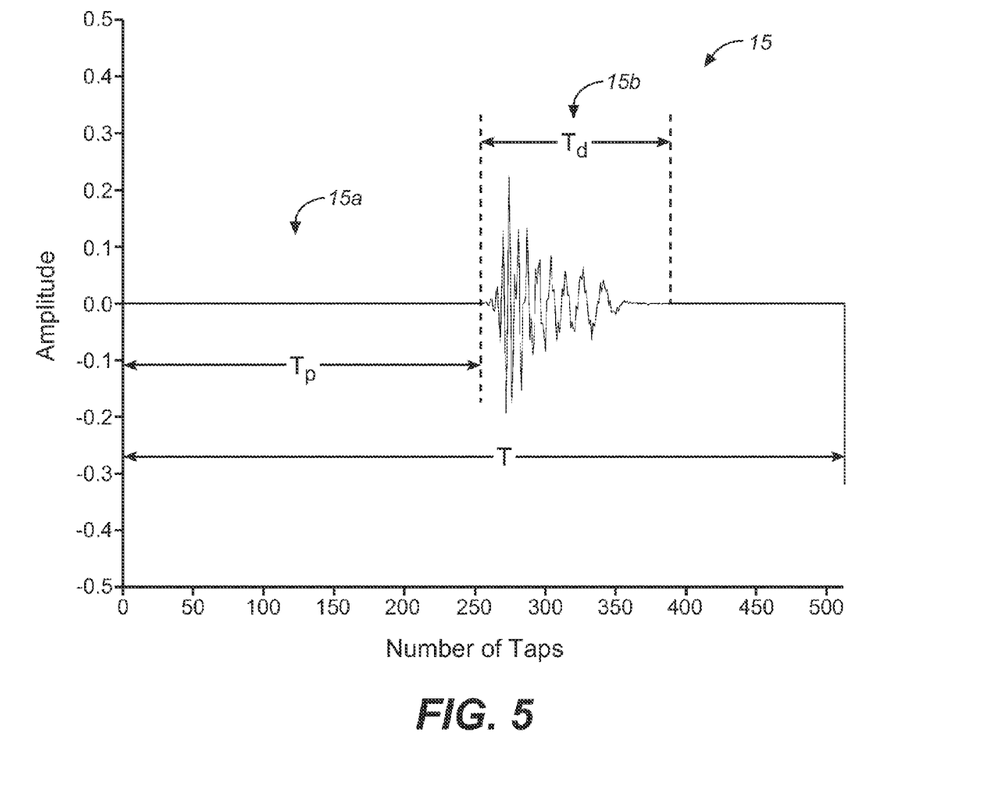
FIG. 5 is an illustration of an impulse response characteristic of a typical echo path.

Prior to a description of a method of locating an active region of an echo path and subsequent application of a short adaptive filter to the active region, a brief description of an echo path may be helpful in understanding the concepts disclosed herein. Accordingly, turning momentarily to FIG. 5, an impulse response characteristic 15 of a typical echo path generated by a telephone network, for example, the PSTN 10, and to be canceled by an echo canceller, for example, the echo canceller 16, will now be described in greater detail. As may now be seen, the impulse response characteristic 15 of an echo path contains two main parts—a pure delay portion 15a and a dispersive delay portion 15b. The dispersive delay, labeled $T_d$ in FIG. 5, is that portion of the echo pulse which represents the delay between the departure of the $R_{OUT}$ signal from the echo canceller 16 and the arrival of the $S_{IN}$ signal at the echo canceller 16 caused by the coupling of the hybrid 12 between the input lines 13a and the output lines 13b. The pure delay portion 15a, labeled $T_p$ in FIG. 5, is that portion of the echo pulse that represents the delay between the departure of the $R_{OUT}$ signal from the echo canceller 16 and the arrival of the $S_{IN}$ signal at the echo canceller 16 without taking into account the dispersive delay $T_d$. Thus, the total delay in the echo path is given by $(T_p+T_d)$. There are various ways that the delay may be expressed. In FIG. 5, the delay is shown in terms of number of adaptive filter taps. Alternately, the delay in terms of time can be obtained by dividing the number of filter taps by the sampling rate of 8 KHz. For example, for the response characteristic 15 illustrated in FIG. 5, $T_p=32$ msec and $T_d=18$ msec. Thus, the total delay in the echo path would be about 50 msec.

Assuming that $T_p^{max}$ and $T_d^{max}$ are the maximum delays for the telephone network, for example, the PSTN 10, in order to ensure that the telephone network has sufficient echo cancellation, the maximum echo path T must be greater than the sum of $T_p^{max}$ and $T_d^{max}$. In other words, a maximum echo path T must be selected such that $T>(T_p^{max}+T_d^{max})$ is correct. For example, in FIG. 5, the maximum echo path T has been selected to be about 64 msec, a value which clearly exceeds the sum of $T_p$ and $T_d$.

In the description provided below in conjunction with FIG. 6, the location of the active region within the impulse response characteristic of the echo path is set to $T_a$. It follows from FIG. 5, therefore, that $T_a<T$, where T is the maximum echo path. Accordingly, the location of the active region in terms of the filter tap number would be $D=T_a*F_s$, where $F_s$ is the sampling rate. This location D is estimated by a Frequency Domain Adaptive Filter (FDAF) algorithm executed by the active region locator application 46. The FDAF algorithm executed by the active region locator application 46 is different from the actual short adaptive filter used to cancel the echo path. More specifically, the FDAF algorithm is used to determine the location of the active region. The determined location is then used to construct the adaptive filter capable of canceling the echo path.

A method by which an active region of an echo path may be located will now be described in greater detail. It is noted that, generally, the location of an active region can be anywhere within an echo having a maximum echo path T. In accordance with the teachings of the present invention, the location of the active region is identified by an adaptive algorithm executed by the active region location application 46. Using the identified location of the active region, a short adaptive filter may then be applied to the active region, thereby saving a considerable amount of processing time, specifically, the processing time required to generate an adaptive filter for the entire echo path. For example, presuming that the echo path for which an active region is to be located has a length T equal to 128 msec and a sampling rate $F_s$ of 8 KHz. An adaptive filter for such an echo would need to have a length N equal to 1,024 taps. In the past, an adaptive filter would have to span the entire echo path. However, because of linear convolution processes involved with this calculation, spanning the entire length of the echo path results in a significant level of computational complexity, even with use of the NLMS algorithm. In contrast with the foregoing, the methods disclosed herein determines the location of the active region of an echo path to be canceled and, as a result, reduces the computation complexity involved by:

(1) processing a block of samples of the far-end and near-end signals $R_{IN}(n)$ and $S_{IN}(n)$ together; and (2) performing the computation in the frequency domain.

Figure 6:
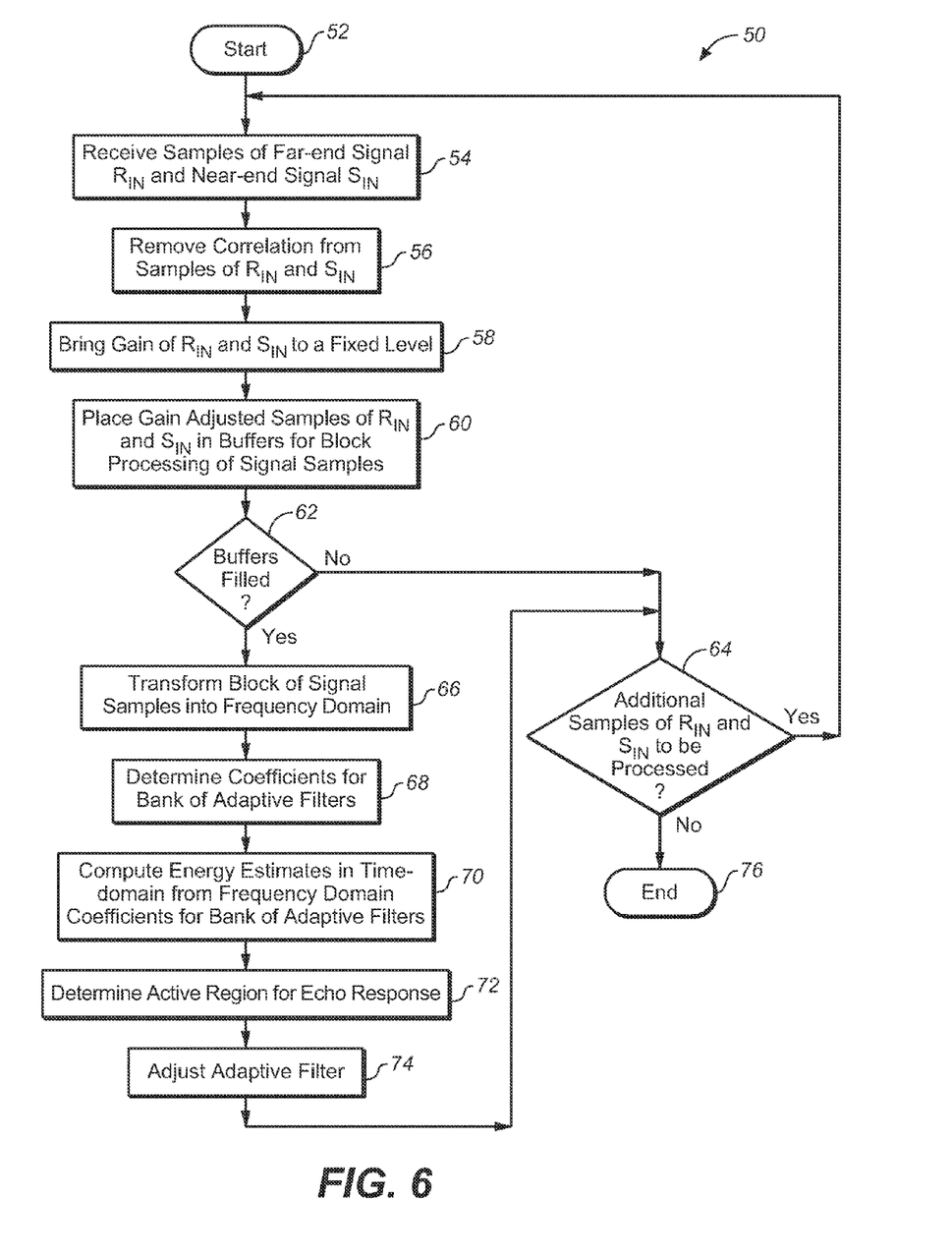
FIG. 6 is a flow chart of a method for locating an active region of an echo path, such as the echo path of FIG. 5, to be cancelled by the echo canceller of FIG. 2.

Referring next to FIG. 6, a method 50 by which the active region location estimator 38 of FIG. 4 determines an active region of an echo path to be cancelled by the echo canceller 16 of FIG. 2 will now be described in greater detail. In the description that follows, it should be noted that n denotes the time index of a particular sample and that $R_{IN}(n)$ and $S_{IN}(n)$ respectively denote the corresponding samples of the far-end and near-end signals. The method 50 commences at step 52 and, at step 54, samples of the far-end and near-end signals $R_{IN}(n)$ and $S_{IN}(n)$ are input the short adaptive filter 36 and the signal processing application 44 of the active region location estimator 38. Proceeding on to step 56, the signal processing application 44 applies pre-emphasis filtering to the far-end and near-end signals $R_{IN}(n)$ and $S_{IN}(n)$ to remove as much correlation among the samples as is possible. In this regard, it is noted that consecutive samples of speech signals contain a fair amount of correlation. By removing this correlation, the active region locator application 46 will more quickly converge to a solution and, as a result, the active region location estimator 38 will be able to more quickly identify the location of the active region of the echo path.

The pre-emphasis filtering applied to the far-end and near-end signals $R_{IN}(n)$ and $S_{IN}(n)$ at step 56 utilizes a simple first order Finite Impulse Response (FIR) filtering process. Presuming y(n) and s(n) are the outputs of the pre-emphasis filtering, then y(n) and s(n) may be determined from the far-end and near-end signals $R_{IN}(n)$ and $S_{IN}(n)$ in accordance with the following relationship:

$$y(n) = R_{IN}(n) - \beta R_{IN}(n-1)$$

$$s(n) = S_{IN}(n) - \beta S_{IN}(n-1) \quad (1)$$

where β is the decorrelation parameter and selected to be β=0.875.

To meet the requirements of the G.168 standards, the echo canceller 16 must be able to work with input signal levels having a large dynamic range. Thus, in order to have uniform convergence of the short adaptive filter 36 at both ends of the input levels, at step 58, the signal processing application 44 brings the gain of the far-end and near-end signals $R_{IN}(n)$ and $S_{IN}(n)$ to fixed levels. The variable gain that needs to be applied to the far-end and near-end signals $R_{IN}(n)$ and $S_{IN}(n)$ may be determined by the far-end and near-end signals $R_{IN}(n)$ and $S_{IN}(n)$ themselves utilizing a first order Infinite Impulse Response (IIR) filtering process. Preferably, the filter coefficients are chosen such that the response of the IIR filter decays so fast that the influence of samples of the far-end and near-end signals too distant into the past are negligible.

The time-varying gains $\gamma_y(n)$ and $\gamma_s(n)$ for the far-end and near-end signals $R_{IN}(n)$ and $S_{IN}(n)$, respectively, may be determined from the following:

$$\gamma_y(n) = (1-\alpha)\gamma_y(n-1) + \alpha|y(n)|$$

$$\gamma_s(n) = (1-\alpha)\gamma_s(n-1) + \alpha|s(n)| \quad (2)$$

where $\alpha = 2^{-3}$. Using these gain factors, the pre-emphasis filtered far-end and near-end signals $R_{IN}(n)$ and $S_{IN}(n)$ are gain corrected at step 58 to produce the following:

$$y_g(n) = \frac{\Gamma}{\gamma_y(n)} y(n) \quad (3)$$

$$s_g(n) = \frac{\Gamma}{\gamma_s(n)} s(n)$$

where $y_g(n)$ is the far-end signal $R_{IN}(n)$ after pre-emphasis filtering and gain correction, $s_g(n)$ is the near-end signal $S_{IN}(n)$ after pre-emphasis filtering and gain correction, and Γ is a fixed gain factor that does not depend on the input signal level.

Proceeding on to step 60, the signal processing application 44 places the gain corrected and pre-emphasis filtered far-end and near-end samples $y_g(n)$ and $s_g(n)$ in the far-end and near-end memory areas 48a and 48b, respectively. It is contemplated that the size of the far-end and near-end memory areas 48a and 48b may vary depending on a number of considerations. In this regard, it is noted that the use of large block sizes will dramatically reduce the computational complexity of the adaptive algorithm to be executed by the active region locator application 46. On the other hand, however, large block sizes also tend to reduce the resolution of the estimate of the location of the active region. Accordingly, the size of the far-end and near-end memory areas should be chosen to achieve a satisfactory reduction in computational complexity while simultaneously maintaining good resolution in estimates of the location of the active region. A suitable block size M for both the far-end memory area 48a and the near-end memory area 48b is M=16. Of course, it should be clearly understood that various the far-end and near end memory areas 48a and 48b may have other block sizes and still be suitable for the purposes contemplated herein.

After placing the gain corrected and pre-emphasis filtered far-end and near-end samples $y_g(n)$ and $s_g(n)$ in the far-end and near-end memory areas 48a and 48b, respectively, at step 60, the method proceeds to step 62 where a determination is made if the far-end and near-end memory areas 48a and 48b are filled. A memory area is filled when the number of samples placed in the memory area is equal to the block size M. If there are less than M samples in the far-end and near-end memory areas 48a and 48b, the method proceeds to step 64 for a determination if next samples of the far-end and near end signals $R_{IN}(n)$ and $S_{IN}(n)$ are available. If it is determined at step 64 that next samples of the far-end and near-end signals $R_{IN}(n)$ and $S_{IN}(n)$ are available, the value of n is incremented by one and the method returns to step 54 for further processing in the manner previously described. If, however, it is determined at step 64 that next samples of the far-end and near-end signals $R_{IN}(n)$ and $S_{IN}(n)$ are not available, the method will instead end at 76.

Returning now to step 62, if it is instead determined that the far-end and near-end memory areas 48a and 48b are filled, the method will proceed to 66 where the active region locator application 46 will begin processing the contents of the far-end and near-end memory areas 48a and 48b. More specifically, the far-end and near-end memory areas 48a and 48b are now filled with a block of M samples of the far-end and near-end signals $R_{IN}(n)$ and $S_{IN}(n)$ after pre-emphasis filtering and gain correction. The block of M samples contained in the far-end and near-end memory areas 48a and 48b may be represented as follows:

$$y(k)=[y_g(kM), y_g(kM-1) \ldots y_g(kM-M)]^T$$

$$s(k)=[s_g(kM), s_g(kM-1) \ldots s_g(kM-M)]^T \quad (4)$$

where $y(k)$ and $s(k)$ are two column vectors containing M samples of far-end and near-end signals respectively and k is the block index. As will be more fully described below, all subsequent processing on the block of M samples of the far-end and near-end signals $R_{IN}(n)$ and $S_{IN}(n)$ will operate on the column vectors $y(k)$ and $s(k)$ while all subsequent updates shall be synchronized with the block index k. Vectors $y(k)$ and $s(k)$ shall also be updated for every M input samples of the far-end and near-end signals $R_{IN}(n)$ and $S_{IN}(n)$.

At step 66, the active region locator application 46 begins the processing of the far-end and near-end signal vectors $y(k)$ and $s(k)$ to determine the active region for the echo path. To do so, the active region locator application 36 will first transform, at step 66, the far-end and near-end signal vectors $y(k)$ and $s(k)$ into the frequency domain using the DFT in accordance with the following relationship:

$$f_y(k)=Ty(k)$$

$$f_s(k)=Ts(k) \quad (5)$$

where $f_y(k)$ and $f_s(k)$ are the DFTs of $y(k)$ and $s(k)$ respectively, and T is the DFT matrix given by:

$$\begin{bmatrix} 1 & 1 & \ldots & 1 \\ 1 & e^{-2\pi i/M} & \ldots & e^{-2\pi i(M-1)/M} \\ \vdots & \vdots & \vdots & \vdots \\ 1 & e^{-2\pi i(M-1)/M} & \ldots & e^{-2\pi i(M-1)^2/M} \end{bmatrix} \quad (6)$$

Continuing on to step 68, the active region locator application 46 determines a set of coefficients for a bank of adaptive filters intended to replace the longer original adaptive filter. In this regard, it should be noted that the Fourier vectors $f_y(k)$ and $f_s(k)$ set forth in Equation (5) are complex in nature. As the DFT is an orthogonal transform, however, the elements of the Fourier vectors $f_y(k)$ and $f_s(k)$ are independent of each other. As a result, the elements of the Fourier vectors can be processed independently. Further, as the Fourier coefficients are complex in nature, only the first J=M/2 coefficients are necessary for processing.

If the original length of the adaptive filter, i.e., an adaptive filter sized to span the entire echo path, is N, the DFT transforms this long adaptive filter into J independent parallel adaptive filters each with L=N/M number of taps. As a result, therefore, one adaptive filter of length L is being processed for every two input samples. Since the coefficients are now complex, in effect, one complex adaptive filter of length L/2 is being processed for every input sample. Accordingly, block processing in the frequency domain reduces the computational complexity by a factor of M.

Letting $W(k)$, a matrix of dimensions L×J, represent a bank of short adaptive filters to be used in place of the original large adaptive filter, each column vector of the matrix $W(k)$ would represent the coefficients of one short adaptive filter of the bank. Accordingly, there are J such columns, each representing one of the short adaptive filters. Mathematically this can be represented as follows:

$$W(k)=[w_0(k), w_1(k), \ldots, w_J(k)] \quad (7)$$

where $w_j(k)$s are a series of vectors, each representing a short adaptive filter of length L which may be represented by the following:

$$w_j(k)=[w_j(0,k), w_j(1,k), \ldots, w_j(L,k)]^T \quad (8)$$

The process of estimating the active region from the adaptive filter coefficients determined at step 68 continues at step 70 with the active region locator application 46 computing time domain energy estimates from the determined frequency domain coefficients for the bank of adaptive filters. Presuming that the result of the energy computation shall be a vector of length L containing the energies, using Parseval's theorem, the energy in the filter coefficients over the $l^{th}$ window in time-domain can be calculated directly from the frequency-domain adaptive filter coefficients as follows:

$$P_l(k) = \sum_{j=0}^{J-1} |W_j^l(k)|^2 \quad (9)$$

where $W^l(k)$ is the $l^{th}$ row of the adaptive filter coefficient matrix $W(k)$.

By using the foregoing method, the computationally expensive operation of computing L number of IDFTs can be avoided. More specifically, as previously set forth, the adaptive filter coefficients contained in the matrix W are in frequency domain. Absent use of the aforedescribed computation at step 70, in order to compute the location of the active region, the frequency domain adaptive filter coefficients would first need to be transformed into the time domain using the IDFT. To do so would require the IDFT of each row of the matrix W to be stacked together in one long vector. The result of this computation are time domain energy estimates over a number of small windows. Of these, the window with the largest energy provides an estimate of the location of the active region of the echo. If the window length is the same size as the block size M, then there will be L windows for which the energy would have to be computed. As a result, for each block, L number of M-point IDFTs would have to be computed, a process which would entail considerable computational complexity.

It is noted that the foregoing technique provides considerable flexibility when selecting the technique to be used to determine estimates for the location of the active region. More specifically, it is contemplated that, if more accurate estimates are needed, then additional computation time may be used to determine all of the J adaptive filters. Conversely, a considerable amount of computation resources may be conserved if the loss of some precision is acceptable. Thus, the disclosed method provides a mechanism by which both computational load and accuracy may be adjusted.

Proceeding on to step 72, the active region locator application 46 determines the location of the active region from the energy estimates computed at step 70 by comparing the energy estimates to a pre-defined threshold value and identifying, as a first estimate of the location of the active region, the index of the energy that crosses the pre-determined threshold value. Letting I be the index where the maximum energy is located and is computed from the L values, then an estimate $\hat{D}$ of the location of the active region D can be obtained from the following relationship:

$$\hat{D}=(I-1)M+M/2 \quad (10)$$

An advantage of the above-described method of computing energy estimates is that it also enables a selective reduction of the computational resources used when estimating a location of the active region. More specifically, recalling, from equation (5), that the summation was carried out over J values of the filter coefficients. However, as we are only interested in energy values, some terms can be dropped with only a small loss of precision. As a result, out of J adaptive filters, some of them can be eliminated. This reduces the amount of both computational resources and memory storage required. Again, however, this reduction does come at the loss of some precision.

After determining the location of the active region at step 72, the method proceeds to step 74, where the active region locator application 46 provides, as an output to the short adaptive filter 36, the location $T_a$ of the active region. In turn, the short adaptive filter 36 is centered on the newly provided location $T_a$ (or, if a value for $T_a$ was previously provided to the short adaptive filter 36, the short adaptive filter 36 is adjusted to center on the newly provided location $T_{a-next}$.

After adjusting the short adaptive filter 36 to center on the location $T_a$, the method proceeds to step 64 for possible updating of the short adaptive filter. More specifically, it is contemplated that each of the J adaptive filters constructed shall be updated once for every block; i.e. for every M number of input samples. Accordingly, at step 64, it is determined as to whether there are additional samples of the far-end and near-end signals $R_{IN}$ and $S_{IN}$ to be processed. If it is determined at step 64 that there are no additional samples of the far-end and near-end signals $R_{IN}$ and $S_{IN}$ to be processed, the method ends at step 76. If, however, it is determined that there are additional samples of $R_{IN}$ and $S_{IN}$ to be processed, the far-end and near-end buffers 48a and 48b are cleared and the method returns to step 54 for further processing in the manner previously set forth.

In subsequent iterations of the method described in steps 54 through 74, it should be noted that the NLMS algorithm for updating the coefficients of the $j^{th}$ (as well as any other filters) $w_j(k)$, which is the $j^{th}$ column of W(k), may be determined by first presuming that the inputs to the adaptive filters are the $j^{th}$ elements of the DFT vectors $f_y(k)$ and $f_s(k)$. Then, letting X(k) be a matrix of dimension L×J which represents the state vectors of the bank of adaptive filters 66, it will follow that the $j^{th}$ column of X(k) will be the state vector of the $j^{th}$ adaptive filter 66. Thus, the state vector up to the $(k-1)^{th}$ block can be written as $$x_j(k-1)=[f_y^j(k-1),f_y^j(k-2),\ldots f_y^j(k-L+2)]^T \quad (11)$$

where $f_y^j(k-1)$ is the $j^{th}$ element of the DFT coefficient vector of the far-end signal for the $(k-1)^{th}$ block. Using the new DFT coefficient vector for the present $(k^{th})$ block as defined in equation (5), the state vector for the $j^{th}$ adaptive filter is updated by discarding the last element and by inserting the new sample at the beginning of the vector. With this operation, the updated state vector becomes:

$$x_j(k)=[f_y^j(k),f_y^j(k-1),\ldots f_y^j(k-L+1)]^T \quad (12)$$

An estimate $\hat{f}_s^j(k)$ of the $j^{th}$ element of the near-end fourier coefficient $f_s^j(k)$ may then be computed. This estimate, which is obtained by determining the output of the $j^{th}$ adaptive filter using the above updated state vector and the $j^{th}$ filter coefficient vector defined in equation (8), is defined by the following relationship:

$$\hat{f}_s^j(k)=w_j^H(k)x_j(k) \quad (13)$$

where H represents the Hermitian transpose operation. The error for the $j^{th}$ adaptive filter 66 may now be determined to be:

$$e_j(k)=f_s^j(k)-\hat{f}_s^j(k) \quad (14)$$

Using the updated state vector in equation (12) and the error from equation (14), the $j^{th}$ adaptive filter coefficients are updated in accordance with the following;

$$w_j(k)=w_j(k-1)+2\mu\xi_j^{-2}(k)e_j^*(k)x_j(k) \quad (15)$$

where * denotes complex conjugation, $\mu$ is a small value called the adaptation constant and $\xi_j(k)$ is a normalization factor for the $j^{th}$ adaptive filter which takes into account the variation of the input values. The value of $\xi_j(k)$ is computed using a simple first order IIR filter as follows:

$$\xi_j(k)=(1-\delta)\xi_j(k-1)+\delta|f_y^j(k)| \quad (16)$$

where $\delta=2^{-7}$ is the coefficient of the IIR filter and is chosen such that the normalization factor is computed over a sufficient length of input values.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for determining the location of an active region of an echo path, comprising:
   acquiring a first plurality of far-end signals $R_{IN}(n)$;
   acquiring a second, corresponding, plurality of near-end signals $S_{IN}(n)$;
   pre-emphasis filtering the first plurality of far-end signals Rin(n) and the corresponding plurality of near-end signals Sin(n);
   reducing the range of input levels of the filtered signals by bringing the first plurality of filtered far-end signals $R_{IN}(n)$ and the second plurality of filtered near-end signals $S_{IN}(n)$ to uniform levels:
   generating a set of frequency domain coefficients from the reduced input level range acquired signals, each one of the generated frequency domain coefficients describing a filter which covers a respective portion of the echo path;
   determining at least one time domain energy estimate from the generated set of frequency domain coefficients; and estimating the location of the active region of the echo path from the at least one time domain energy estimate determined from the generated set of frequency domain coefficients.

2. The method of claim 1, wherein estimating the location of the active region of the echo path from the at least one time domain energy estimate determined from the generated set of frequency domain coefficients further comprises:
  selecting a first one of the time domain energy estimates as the location of the active region of the echo path.

3. The method of claim 2, wherein the selecting a first one of the energy estimates as the location of the active region of the echo path further comprises:
  comparing the level of each one of the at least one energy estimates to a pre-selected threshold value; and
  selecting, as the first one of the energy estimates, the energy estimate exceeding the pre-selected threshold value.

4. The method of claim 2, wherein determining at least one time domain energy estimate from the generated set of frequency domain coefficients further comprises determining said at least one time domain energy estimate by applying Parseval's relation to the generated set of frequency domain coefficients.

5. The method of claim 2, wherein:
  the generated set of frequency domain coefficients further comprises a matrix; and
  determining at least one time domain energy estimate from the generated set of frequency domain coefficients further comprises:
    selecting a row from the matrix of frequency domain coefficients; and
    determining the time domain energy estimates of the selected row of frequency domain coefficients;
    wherein the time domain energy estimates of the selected row of frequency domain coefficients are determined by applying Parseval's relation to the selected row of frequency domain coefficients.

6. The method of claim 2, wherein:
  the generated set of frequency domain coefficients further comprises a matrix; and
  determining at least one time domain energy estimate from the generated set of frequency domain coefficients further comprises:
    selecting at least two rows from the matrix of frequency domain coefficients; and
    determining the time domain energy estimates of each selected row of frequency domain coefficients;
    wherein the time domain energy estimates of each selected row of frequency domain coefficients is determined by applying Parseval's relation to the selected row of frequency domain coefficients.

7. The method of claim 6, wherein the selecting a first one of the time domain energy estimates as the location of the active region of the echo path further comprises:
  comparing the level of each one of the time domain energy estimates to a pre-selected threshold value; and
  selecting, as the location of the active region of the echo path, the time domain energy estimate having a level exceeding the pre-selected threshold value.

8. The method of claim 1, wherein generating a set of frequency domain coefficients from the reduced input level range acquired signals further comprises:
  constructing, from the first plurality of reduced input level range acquired far end signals $R_{IN}(n)$, a column vector of the reduced input level range far end signals;
  constructing, from the second plurality of reduced input level range acquired near end signals $S_{IN}(n)$, a column vector of the reduced input level range near end signals;
  transforming the reduced input level range far-end and near-end signal column vectors into the frequency domain;
  independently processing the frequency domain far-end signal column vector and the frequency domain near-end signal column vector; and
  identifying the set of frequency domain coefficients from the transformed reduced input level range far-end and near-end signal column vectors.

9. The method of claim 8, wherein the far-end and near-end reduced input level acquired signals are transformed into the frequency domain by application of a Discrete Fourier Transform (DFT).

10. A method for canceling an echo path, comprising:
  acquiring a first plurality of far-end signals $R_{IN}(n)$ and a corresponding plurality of near-end signals $S_{IN}(n)$;
  pre-emphasis filtering the first plurality of far-end signals $R_{IN}(n)$ and the corresponding plurality of near-end signals $S_{IN}(n)$;
  gain correcting the pre-emphasis filtered first plurality of far-end signals $R_{IN}(n)$ and the pre-emphasis filtered corresponding plurality of near-end signals $S_{IN}(n)$;
  constructing, from the first plurality of gain-corrected and pre-emphasis filtered far-end signals $R_{IN}(n)$, a column vector of the far-end signals;
  constructing, from the second plurality of gain-corrected and pre-emphasis filtered near-end signals $S_{IN}(n)$, a column vector of the near-end signals;
  determining Discrete Fourier Transforms (DFTs) of the column vector of the gain-corrected and pre-emphasis filtered far-end signals $R_{IN}(n)$ and the gain-corrected and pre-emphasis filtered column vector of the near-end signals $S_{IN}(n)$;
  identifying a bank of adaptive filters from the DFTs of the column vector of the far-end signals $R_{IN}(n)$ and the column vector of the near-end signals $S_{IN}(n)$;
  computing a time domain energy estimate for each one of the bank of adaptive filters;
  determining a location of an active region of the echo path from the time domain energy estimates; and
  canceling the echo path by applying an adaptive filter to the determined location of the active region.

11. The method of claim 10, wherein each one of the bank of adaptive filters is defined by a set of coefficients and wherein computing a time domain energy estimate for each one of the bank of adaptive filters further comprises:
  applying Parseval's relation to the set of coefficients for each one of the bank of adaptive filters.

12. The method of claim 11, wherein determining a location of an active region of the echo from the energy estimates further comprises:
  comparing each one of the time domain energy estimates to a pre-selected threshold value; and
  selecting a first one of the time domain energy estimates, the selected time domain energy estimate having a value which exceeds the pre-selected threshold value;
  determining, as the location of the active region, the location of the selected time domain energy estimate.

13. The method of claim 12, and further comprising
  storing the first plurality of gain-corrected and pre-emphasis filtered far-end signal $R_IN(n)$ in a first block;
  storing the second plurality of gain-corrected and pre-emphasis filtered near-end signals $S_{IN}(n)$ in a second block; and processing said first plurality of gain-corrected and pre-emphasis filtered far-end signal $R_{IN}(n)$ together with said second plurality of gain-corrected and pre-emphasis filtered near-end signals $S_{IN}(n)$ to determine said set of coefficients for said bank of adaptive filters.

14. An echo canceler, comprising:

an active region location application configured to (a) transform a block of time domain gain-corrected and pre-emphasis filtered far-end signals $R_{IN}(n)$ and a block of time domain gain-corrected and pre-emphasis filtered near-end signals $S_{IN}(n)$, (b) determine time energy estimates from the frequency domain coefficients of the bank of adaptive filters and (c) adaptively locate an active region of an echo from the time domain energy estimates; and an adaptive filter, coupled to the active region locator circuit, the adaptive filter configured to apply a filter to locations, indicated by the active region locator circuit, as locations of the active region of the echo.

* * * * *